(12) United States Patent
Wooldridge et al.

(10) Patent No.: US 8,499,084 B2
(45) Date of Patent: Jul. 30, 2013

(54) SYSTEM FOR CONDUCTING MULTI-MEDIA COMMUNICATION SESSIONS

(75) Inventors: Christopher Wooldridge, Neutral Bay (AU); Michael David Howells, Terrigal (AU)

(73) Assignee: Xumii, Inc., San Mateo, CA (US)

( * ) Notice: Subject to any disclaimer, the term of this patent is extended or adjusted under 35 U.S.C. 154(b) by 241 days.

(21) Appl. No.: 12/187,378

(22) Filed: Aug. 6, 2008

(65) Prior Publication Data

US 2009/0094369 A1    Apr. 9, 2009

Related U.S. Application Data

(63) Continuation-in-part of application No. PCT/AU2007/000123, filed on Feb. 6, 2007.

(30) Foreign Application Priority Data

Feb. 6, 2006  (AU) ................................ 2006900551

(51) Int. Cl.
G06F 15/16  (2006.01)
(52) U.S. Cl.
USPC .......................................... 709/228; 455/566
(58) Field of Classification Search
USPC .................... 709/203, 228; 455/566
See application file for complete search history.

(56) References Cited

U.S. PATENT DOCUMENTS

| | | | | |
|---|---|---|---|---|
| 7,730,216 | B1 * | 6/2010 | Issa et al. ....................... | 709/250 |
| 2002/0138660 | A1 * | 9/2002 | Eilers et al. .................... | 709/313 |
| 2005/0213537 | A1 * | 9/2005 | Ingimundarson et al. .... | 370/329 |
| 2005/0240558 | A1 * | 10/2005 | Gil et al. ........................... | 707/1 |
| 2005/0287998 | A1 | 12/2005 | Tonouchi | |
| 2006/0002308 | A1 * | 1/2006 | Na et al. ......................... | 370/252 |
| 2006/0101408 | A1 * | 5/2006 | Kotamarthi et al. .......... | 717/126 |
| 2007/0047516 | A1 * | 3/2007 | Kottilingal .................... | 370/352 |

FOREIGN PATENT DOCUMENTS

| | | |
|---|---|---|
| WO | 00/58855 A1 | 10/2000 |
| WO | 02/056198 A2 | 7/2002 |
| WO | 2005/018201 A1 | 2/2005 |

OTHER PUBLICATIONS

International Search Report dated May 7, 2007 in counterpart PCT application No. PCT/AU2007/000123.

* cited by examiner

*Primary Examiner* — El Hadji Sall
(74) *Attorney, Agent, or Firm* — Blakely, Sokoloff, Taylor & Zafman LLP

(57) ABSTRACT

A system for conducting multi-media communication sessions between two or more terminals includes a smart client application to dynamically load application code and data from servers on demand using an application management protocol. In the present embodiment the smart client is maintained on each terminal and initially executes a core application. This core application provides a user interface for selectively establishing and maintaining a communication session with a remote terminal. The core application also provides a user interface for including shared applications in the session to which the remote terminal has access. The core application provides a further user interface for combining two sessions into one that includes all participants and shared applications from both original sessions. Each shared application provides a user interface to each participant of the session according to their access rights: the participant who added an application to a session will typically have full access, while other participants typically have more restricted access. The core application uses a session management protocol to maintain consistent session state between all terminals involved in a session.

17 Claims, 6 Drawing Sheets

SYSTEM FOR CONDUCTING MULTI-MEDIA COMMUNICATION SESSIONS

CROSS REFERENCE TO RELATED APPLICATIONS

The present application is a continuation-in-part of International Patent Application No. PCT/AU2007/000123, filed Feb. 6, 2007, which claims priority from Australia Patent Application No. AU2006900551, filed Feb. 6, 2006, and the present application claims priority from both applications.

FIELD OF THE INVENTION

The present invention relates to a system for conducting multi-media communication sessions. The invention has been primarily developed for implementing media-rich communication services over packet-switched data networks, particularly present third-generation mobile networks, and will be described herein by particular reference to that application. However, the invention is by no means restricted as such, and has various alternate applications in a broader context.

BACKGROUND

Any discussion of the prior art throughout the specification should in no way be considered as an admission that such prior art is widely known or forms part of common general knowledge in the field.

As telephone and data networks converge towards common technology, new protocols are emerging that allow terminals to establish person-to-person communication sessions over data networks. These new protocols represent an alternative to the ones by which calls are established over conventional telephone networks, allowing those networks to be phased out. Operators of telephone networks have invested in technology required to support these protocols, specifically the 3GPP IP Multimedia Subsystem (IMS), which supports the IETF Session Initiation Protocol (SIP) standard. Alternative communication protocols are already in widespread use in the Internet for Instant Messaging and Presence Services (IMPS) and standards are emerging, specifically the Extensible Messaging and Presence Protocol (XMPP).

The SIP and XMPP standards define general purpose session control protocols that do not restrict the media used in the session. Despite this flexibility, individual SIP or XMPP applications tend to focus on one particular kind of session, such as text message chat (Instant Messaging) or a particular game. As a result the user experience tends to involve many distinct, unrelated applications, and the user must decide which to use for each kind of session. It is widely thought that customers are overwhelmed with the complexities of using such a large number of applications, and hence commercial uptake would be hindered.

A particular challenge faced by users of conventional applications is that, in order to change the kind of session they are in, they must change applications; from an IM application to a game, for example. As each application presents the user with its own set of concepts and controls, and manages its own set of sessions, the transition is not particularly smooth for the participants of the session. Furthermore, the user must manually re-establish the original session in the new application, even when the new session involves the same set of participants.

Another challenge faced by users of communication applications is that all participants in a particular kind of session must have the appropriate application installed on their terminal. Requiring all participants to already have the same application before a session can start severely limits spontaneity. This requirement is a major barrier to the adoption of new services, as demonstrated by the relatively slow take up of the Multimedia Messaging Service and Video Telephony.

These challenges are not faced by people in a real world conversation. For example: people might start talking, then look through some photographs together, and then start playing a game. In face-to-face situations parties may spontaneously include many forms of media in the conversation to enrich it. At a conceptual level the common thread is the conversation, not the media being used within it. This concept is often lost in the conventional approach to SIP or XMPP applications.

Some personal computer applications allow conference sessions to be established where any party is able to share many other applications with other parties even if those other parties do not have those applications installed. However, these conferencing applications require a reliable, high-bandwidth network connection, the capacity to store relatively large amounts of application data, and typically a large screen area and a pointing device. Known approaches along such lines are not suitable for communication sessions using handheld terminals, given that handheld terminals have relatively limited network, memory, processor, display, and input capabilities.

SUMMARY

It is an object of the present invention to provide an improved an improved system for conducting multi-media communication sessions.

It is an object of the present invention in its preferred form to provide a system for conducting multi-media communication sessions on communication terminals. A feature of this system is the use of a smart client able to dynamically download and execute applications on demand.

In accordance with a first aspect of the invention, there is provided a system for dynamically loading application code and data onto a communication terminal coupled to a network for facilitating and enriching communication sessions, the system including:

a client application maintainable on the communication terminal for loading on demand data and executable code from a server in the network, the data and executable code representing an application held temporarily on the communication terminal and executed by the client application;

a core application maintainable on core application servers in the network for execution by the communication terminal on demand, and when executed the core application provide a user interface for selectively establishing and maintaining general purpose communication sessions between the communication terminal and one or more second communication terminals;

a multiplicity of shared applications maintainable on shared application servers in the network for execution by the client on demand, and when executed, the shared applications provide a user interface for presenting and controlling a variety of multi-media content from the one or more second communication terminals; and an application management protocol by which the client application communicates with the core application servers and shared application servers on the network to populate and maintain its data and executable code for the core applications and shared applications respectively.

In accordance with a second aspect of the invention, there is provided a system for dynamically loading application code and data onto a communication terminal coupled to a network for facilitating and enriching person-person communication sessions between the users of those terminals, the system including:

a client application maintainable on the communication terminal for loading on demand data and executable code from a server in the network, the data and executable code representing an application held temporarily on the communication terminal and executed by the client application;

a core application maintainable on core application servers in the network for execution by the communication terminal on demand, and when executed, the core application provide a user interface for selectively establishing and maintaining general purpose communication sessions between the communication terminal and one or more second communication terminals;

a multiplicity of shared applications maintainable on shared application servers in the network for execution by the client on demand, and when executed the shared applications provide a user interface for presenting and controlling a variety of multi-media content from the one or more second communication terminals; and an application management protocol by which the client application communicates with the core application servers and shared application servers on the network to populate and maintain its data and executable code for the core applications and shared applications respectively.

Preferably the communication terminal is a handheld device. The handheld device is preferably a cellular telephone.

A user of each communication terminal is preferably allocated one or more unique user identifiers. These users identifies are preferably a SIP address. Alternatively these user identifies are preferably an Instant Messaging service username.

The core application preferably associates with each user identifier a set of subscriptions to shared applications. The core application preferably allows the terminal user to access any shared application to which they have subscribed.

The shared applications preferably associate with each user identifier a collection of data exclusively allocated to that user.

Preferably the application management protocol is carried within the Transmission Control Protocol (TCP). Alternatively the application management protocol is preferably carried within the Hyper-Text Transfer Protocol (HTTP).

Preferably a mechanism is provided for establishing and maintaining communication sessions enriched with shared applications, including:

a user interface to the core application allowing a first user to initiate a session with a second user;

a user interface to the core application allowing a first user to select a shared application to include in the session such that it is accessible to the second user;

a user interface to the shared application allowing the first user full access to their data, and a user interface to the shared application allowing the second user more restricted access to the first user's data;

a user interface to the core application allowing a user to merge two sessions to create a combined session with multiple participants and shared applications; and a session management protocol by which the core application maintains consistent session state between the participating terminals.

This session management protocol is preferably the Session Initiation Protocol (SIP). Alternatively the session management protocol is preferably implemented using any Instant Messaging protocol. Alternatively the session management protocol is preferably based on a peer-to-peer Instant Messaging protocol such as XMPP or IMPS and extensions thereof.

Each shared application preferably included in a session provides a temporary secure key by which session participants may gain access to the shared application.

The core application preferably allows two sessions to be combined into a single session such that the participants and shared applications in the new session include those from both original sessions. More preferably the core application allows a user maintains multiple concurrent sessions and to switch between them.

According to a third aspect of the invention, there is provided a method of conducting a multi-media communication session between a local terminal and a remote terminal including the steps of:

establishing a session between the local terminal and the remote terminal, including negotiating which of a series of media streams is to be included in the session;

adding or removing shared applications at the local or remote terminal selected from those subscribed to by the user of that terminal;

controlling via local or remote users, the multi-media content presented by those shared applications that have been added to the session;

accessing via said terminals, multi-media content provided by shared applications in the session;

switching between shared applications on said terminals while remaining within the same session.

Preferably establishing a session between the local terminal and the remote terminal, includes establishing a connection between a core application server for and the remote terminal, including negotiating which of a series of media streams is to be included in the session, wherein the application server act as proxy for the local terminal.

According to a fourth aspect of the invention, there is provided a method of conducting a multi-media communication session between a local terminal and a remote terminal including the steps of:

establishing a session between core application servers for the local terminal and the remote terminal, including negotiating which of a series of media streams is to be included in a session, where the servers act as proxies for the terminal;

adding or removing shared applications at the local or remote terminal selected from those subscribed to by the user of that terminal;

controlling via local or remote users, the multi-media content presented by those shared applications that have been added to the session;

accessing via said terminals, multi-media content provided by shared applications in the session;

switching between shared applications on said terminals while remaining within the same session.

In accordance with a further aspect of the invention, there is provided a system for dynamically loading applications onto a terminal, the system including:

a client application maintainable on the terminal and able to load on demand data, including executable program code, from servers in the network;

a core application maintainable on servers in the network and executable by the client, the core application providing a user interface for selectively establishing and maintaining general purpose communication sessions between two or more terminals;

a multiplicity of shared applications maintainable on servers in the network and executable by the client, the shared applications providing a user interface for presenting and controlling arbitrary multi-media content; and an application management protocol by which the client application obtains and maintains the data for the core and shared applications, including the code executable by the client application.

Each terminal identifies its user with a unique identifier. The core application associates each user identifier with a set of subscriptions to shared applications. Each shared application associates each user identifier with a collection of application data allocated specifically to that user.

Preferably the terminals are handheld devices. In a preferred embodiment the handheld device is a cellular telephone. In a preferred embodiment the application management protocol is carried within the Hyper-Text Transfer Protocol (HTTP).

As applications are loaded on demand, a terminal with limited resources is capable of running a large range of applications. The client will typically cache application code and data to reduce load times, and optimize transmission using compression. When terminal resources are low, any currently unused applications can be removed from the cache.

According to further aspect of the invention, there is provided a system for managing communication sessions enriched with shared applications, including:

a user interface to the core application allowing a first user to give a second user access to a shared application with a selection of the first user's data accessible;

a user interface to the shared application allowing the first user full access, and a user interface to the shared application allowing the second user more restricted access;

a user interface to the core application allowing a first user to initiate a session with a second user;

a user interface to the core application allowing the participants of a communication session to maintain a list of shared applications;

a user interface to the core application allowing a user to merge two sessions to create a combined session with multiple participants and shared applications; and a session management protocol by which the core application maintains consistent session state between the participating terminals.

In a preferred embodiment the communication sessions between terminals are established and maintained using the Session Initiation Protocol (SIP).

BRIEF DESCRIPTION OF THE DRAWINGS

Benefits and advantages of the present invention will become apparent to those skilled in the art to which this invention relates from the subsequent description of exemplary embodiments and the appended claims, taken in conjunction with the accompanying drawings, in which:

DETAILED DESCRIPTION

Preferred embodiments of the invention will now be described, by way of example only, with reference to the accompanying drawings.

Figure 1:
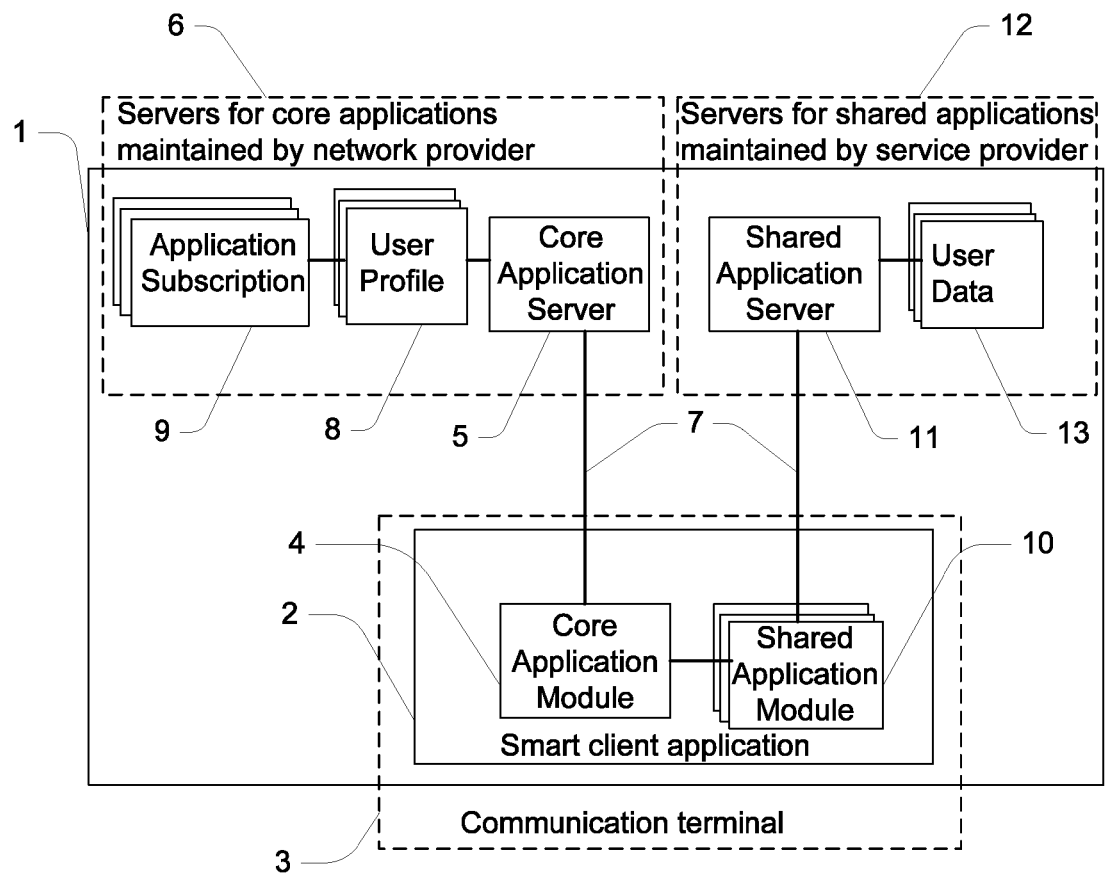
FIG. 1 is a schematic representation of a system in accordance with an aspect of the present invention, loading applications on demand.

FIG. 1 illustrates a first embodiment of a system 1 for dynamically loading and executing applications on demand for the purpose of enriching communication sessions. System 1 includes a smart client application 2 maintainable on a communication terminal 3 coupled to a network. The smart client initially loads a core application module 4 from a core application server 5 on the network, maintained in a preferred embodiment by a network provider 6. The loading and caching of the core application module is facilitated by an application management protocol 7. The unique identifier for the user of the terminal identifies a user profile 8 that includes a set of subscriptions 9 to shared applications.

For the user to access a shared application from their profile 8, the smart client 2 loads a shared application module 10 from a shared application server 11 on the network, maintained in a preferred embodiment by a service provider 12. The loading and caching of the core application module is facilitated by an application management protocol 7. The unique identifier for the user of the terminal identifies a collection of user data 13 associated with the shared application. The shared application module 10 provides a user interface for the presentation and manipulation of the user data 13 from the terminal 3.

A smart client allows a server-based application to create user interface and control logic on a user's communication terminal 3, preferably in the form of a handheld device. This user interface, to the user, looks and feels like a native application. This gives service providers the benefit of network deployment without the unwieldy user experience of WAP or web browsers. Their customers do not have to install new software or upgrade their handset to get new application; as the smart client does it for them transparently on demand.

Figure 2:
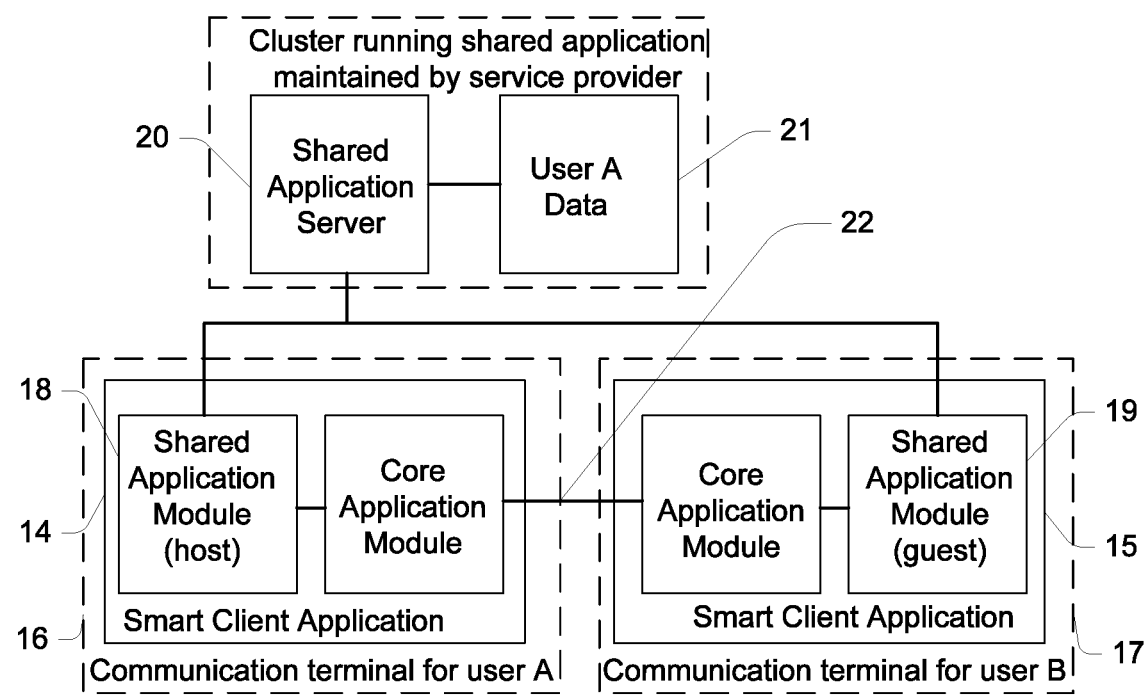
FIG. 2 is a further schematic representation of the system of FIG. 1 in accordance with a further aspect of the present invention, sharing applications in communication sessions, where the session management protocol is employed between the participating smart clients.

FIG. 2 illustrates a second embodiment of a system 1 for the purpose of conducting a communication session. In this embodiment respective versions of the smart client application 14 and 15 are maintained on terminals 16 and 17, the users of these terminals having unique identifiers being designated respectively by reference letters A and B. Each smart client has previously loaded a core application module 4 according to the first embodiment of the system 1.

User A selects user B from their contacts database and a session management protocol 22 is used to establish and maintain a communication session between the smart clients on both terminals.

User A is able to enhance communication with user B by selecting from their user profile 8, as shown in FIG. 1, a shared application and sharing it with user B. The smart client 14 of user A loads a shared application module 18 from the associated shared application server 20. In this embodiment the shared application module 18 provides unrestricted access to the user data 21 associated with user A. The session management protocol 22 is used to ensure that the smart client 15 of user B is aware of the availability of the shared application. The smart client 15 of user B loads a shared application module 19 from the common shared application server 20. The shared application module 18 provides restricted access to the user data 21 associated with user A.

In an alternative embodiment, user A selects a shared application to share with user B, and the session management protocol is automatically used to establish a session, with the shared application already available to both parties.

Either user may freely switch between the core and shared applications. A user may maintain multiple sessions and the core application allows them to switch between sessions. In an established session, a user may freely switch between the shared applications in that session, while maintaining the same session context. A user may also notify other session participants that they should switch to a particular shared application. A shared application may be removed from a session by the user who included it.

Client applications 14 and 15 are, in some implementations, the same. However in other implementations they differ to some degree based on nuances of their respective terminals. The general notion is that they are compatible, or at least have the requisite functionality to execute compatible core applications to allow communication sessions between the terminals.

In the present embodiment communication terminals 16 and 17 are considered to be handheld devices, such as cellular telephones. In other embodiments other handheld terminals are used, and there is no particular requirement that terminal 16 be of the same type as terminal 17. For example: where one terminal is a cellular telephone, and the other is a PDA. At a functional level all that is required is for each of the terminals to have adequate functionality to allow for execution of clients 14 and 15 respectively and also capable of communication with the core application server 5, as shown in FIG. 1, and the shared application server 20.

It will be appreciated by those skilled in the art that the session management protocol 22 is carried over a variety of bearers. One example of a preferred bearer is Smart Messaging via SMS. Another example is an Instant Messaging protocol such as XMPP (standardised by IETF as RFC 3920, 3921, 3922) or IMPS (standardised by OMA). In an exemplary implementation based on XMPP, the session state might be synchronised using the Collaborative Data Objects extension (XEP-0204).

In the present embodiment described here the session management protocol is the Session Initiation Protocol (SIP), as standardised by the Internet Engineering Task Force (IETF) as RFC 3261, which is usually carried over a UDP/IP bearer. For terminals connected to a mobile telephony network, a network operator typically controls the SIP signalling by the using the IP Multimedia Subsystem (IMS), with mobile terminals making full use of the available simultaneous voice & data capabilities of UMTS (3G).

Figure 3:
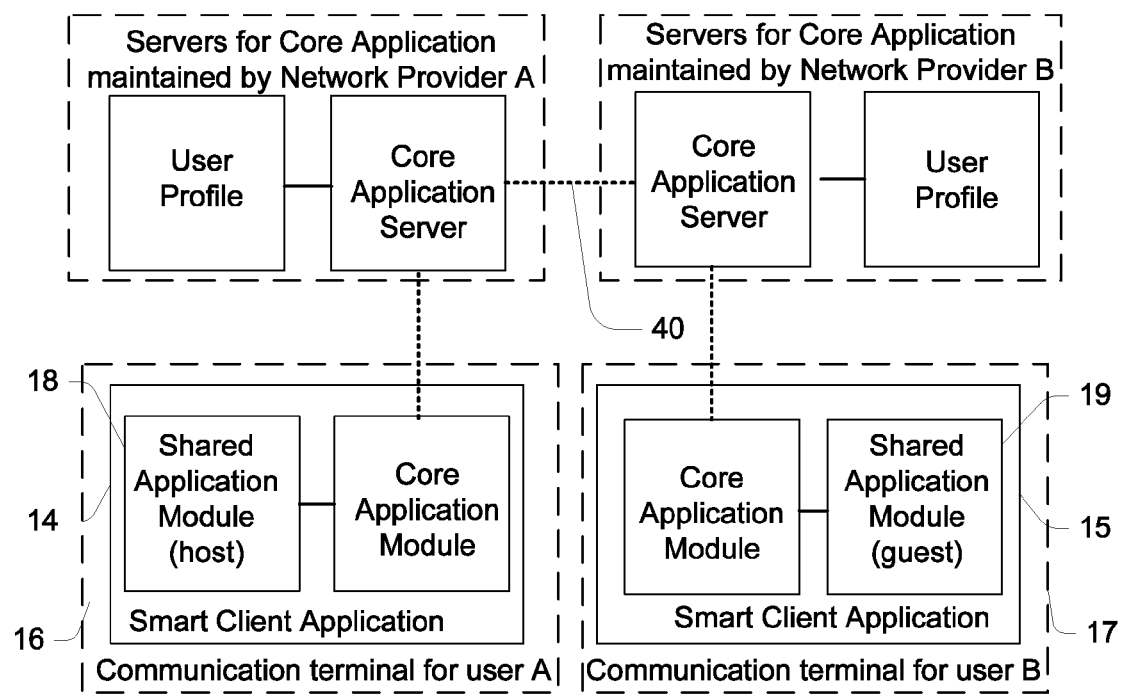
FIG. 3 is an alternative schematic representation of the system of FIG. 1, sharing applications in communication sessions, where the session management protocol is employed between the participating core application servers.

Referring to FIG. 3, an embodiment is shown where comminations terminals do not support the required protocols. In such cases, the session management protocol can be used between the core application servers. In effect the servers act as the terminal, exchanging session management messages 40 as if they were the end terminal, and using the application management protocol to relay events to and from the client application on the terminal proper. There should be no difference in application behaviour visible to the user using this approach.

Returning to FIG. 1, typically, a network operator liaises with a handset manufacturer to have the smart client application 2 pre-installed during manufacture of the terminal. That is, a user purchases a terminal through a network operator, and that terminal already includes an appropriate client 2 for the purposes of system 1. Often this client is to some degree associated with the network operator—for example where only one network operator in a given jurisdiction offers the functionality in question. Other possible approaches to delivering the client—including via WAP Push, memory card, or SIM application—can also be used in some embodiments.

In the preferred embodiment, the network operator maintains the core application module 4 available on the core application server 5, and service providers maintain the shared application modules 10 available on the shared application server 11. By this approach these entities are able to update or modify the application without a need for firmware or software changes at a terminal. That is, the smart client application 2 inherently obtains from servers 5 and 11, a real-time up-to-date version of application modules 4 and 10.

This scalable architecture supports a virtually unlimited number of shared applications and the ability for network and service providers to update existing application without the user having to upgrade their handset hardware or software. The application modules can be typically adapted to specifically suit the relevant terminal and the preferences of the user.

Generally speaking, the user pays a fee to a service provider—typically the administrator of server 11—to subscribe to an application 10. That application is then made available in their user profile 8, and may be selected through the user interface of the core application 4. In some cases subscriptions are automatic and need not be subject to the payment of a fee.

In an exemplary implementation, users subscribe to shared applications 10 by finding them in a Catalogue application, to which all users are automatically subscribed. Often a plurality of Catalogue applications is available—for example applications directed toward different market segments. The Catalogue is available for use outside a session or shared within a session. Once a suitable application has been found in the Catalogue and a subscription purchased, that new application substantially instantly becomes available for use outside a session or within an existing session.

Alternatively, any participant is able to subscribe to an application 10 that is already being shared in a session. They thereby share that same application, but with their own user data 13, in future sessions. This capability—often provided in a "click-to-buy manner"—makes it easier for users to discover new applications and subscribe to them at the moment when they need them, even in the middle of a communication session. In one example, a first user shares a first application with a second user. The second user is impressed with the application, and decides at that time to subscribe so as to share the first application with a third user at a later date.

Typically a smart client 2 holds application code and user data in a cache to improve performance and resilience. The master copy of cached user data 13 is preferably held on a database associated with an application server so that the replacement of a terminal does not result in the loss of valuable data. There is typically also allowance for preservation of digital rights relating to content.

This protocol carries information about a session state that allows it to synchronise session state across all the terminals in a session.

In general, the session management protocol is used to establish sessions and keep the session state in participating terminals synchronised. That session state includes details of the participants, identified by their unique identifiers, a list of shared applications 10, and associated media streams. Whenever a participant adds or removes a shared application, the session management protocol is used to notify the other participants and maintain a consistent session state on all terminals. Each terminal that has the smart client 2 uses the shared application references in the session description to dynamically load the appropriate shared application module 10.

The core application 4 assigns to each shared application 10 in a session a unique security key, only valid for that shared application within the current session. An application server 11 will only allow a client 2 to load or use a shared application module 10 with the requested user data 13 if that client is in possession of the appropriate security key.

It is common for a party to have more than one session active at a time. For example, party A is involved in a first session with party B and a second session with party C. These sessions can be conveniently merged to form a session involving parties A, B and C. This combined session includes all the parties and applications involved in the original two sessions. Functionality is also provided to split a session by creating a separate session with one or a reduced selection of parties involved in an existing session. A terminal merges or splits the session descriptions for the sessions, and uses the session management protocol to synchronise all terminals with the new session state.

In the present embodiment, a session commences with two parties—a calling party and a called party. This session can be subsequently selectively merged to create a multi-party session. In a multi-party session all voice streams are connected together, and all shared applications become shared by all parties in the multi party session. The session management protocol is used to synchronise the session state on all terminals involved so that all parties have the same session state.

A session consists of multiple SIP dialogues. Importantly, a calling party initiates a session management dialogue with a called party and owns that session management dialogue. It follows that if a calling party leaves a multi-party session all dialogues they initiated will end, so all their called parties will also leave the session. If a called party leaves the session the other parties will remain in the session provided there are still two or more parties. When any party leaves a session all their shared applications are removed from the session.

Figure 4:
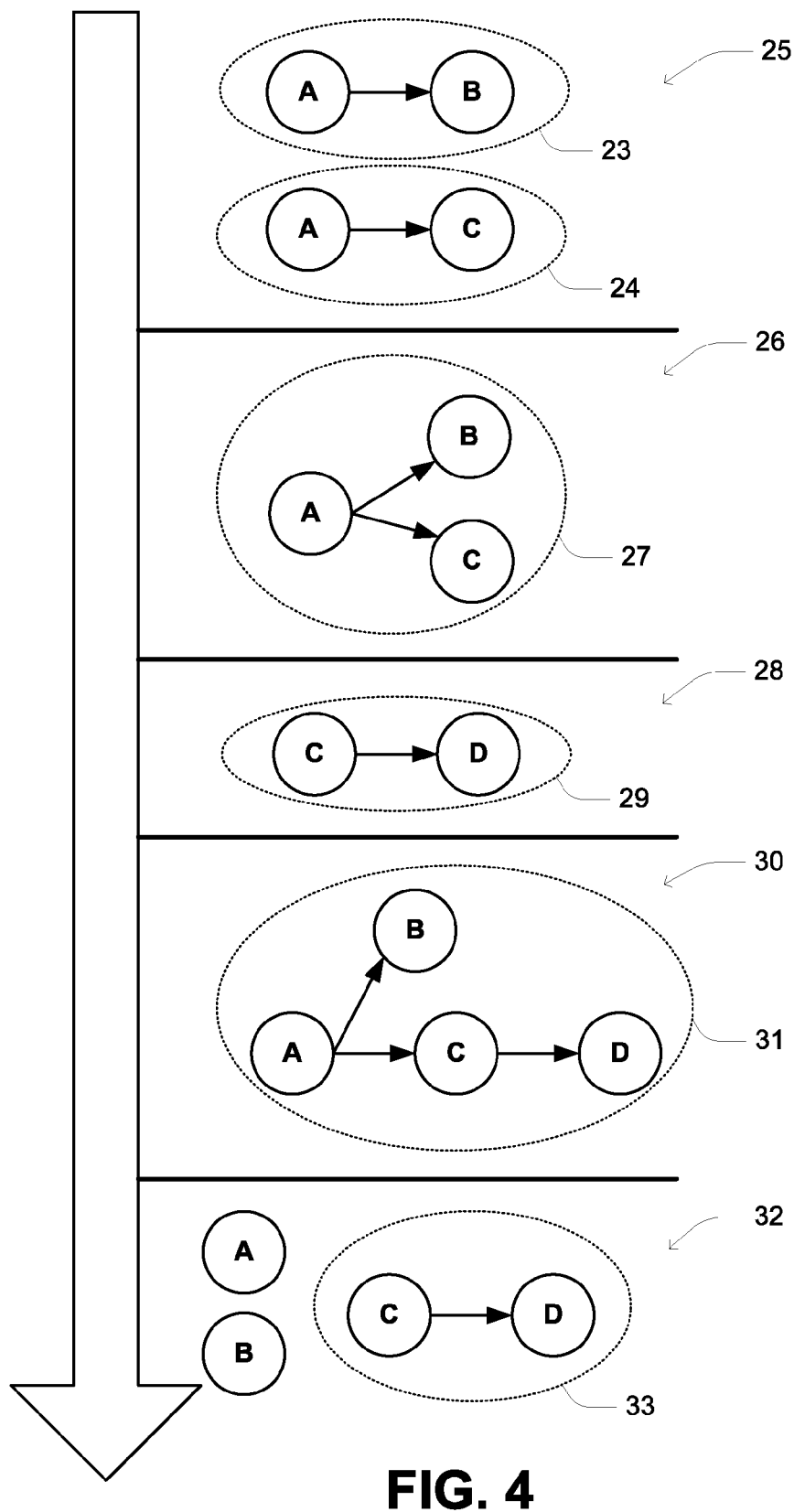
FIG. 4 schematically illustrates a possible evolution of an exemplary multi-party session in the system of FIG. 2.

An example of a multi-party session evolution is provided in FIG. 4. This example shows a plurality of parties, represented by circles. Where lines join circles, this indicates a session management dialogue between parties. An arrow on each line designates the direction from the calling party to a called party. All parties connected together by lines are involved in a single session.

In this example, Party A calls Party B to initiate a session 23, and subsequently calls Party C to initiate a session 24. This is shown at stage 25. At a future stage 26 Party A merges sessions 23 and 24 to create a merged session 27 with Parties B and C. At stage 28 Party C also calls a Party D in a separate session 29. At 30 Party C merges their session 29 with session 27 to create further merged session 31, this session involving all four parties. At stage 32 Party A leaves session 31. As a result, party B also leaves session 31. Party C is able to continue in session 31 with party D. It will be appreciated in this regard that each party has a level of control over the participant or participants they invited.

Returning to FIG. 1, the smart client 2 acts as a container for the application modules 4 and 10, providing them with an Application Programming Interface (API) that permits access to various terminal capabilities, such as telephony, messaging, imaging, contacts, calendar, and so on. It will be recognised that a key element of the described embodiments is a component within the smart client that allows the core application and shared applications to manage sessions with other terminals using SIP.

Figures 5, 6:
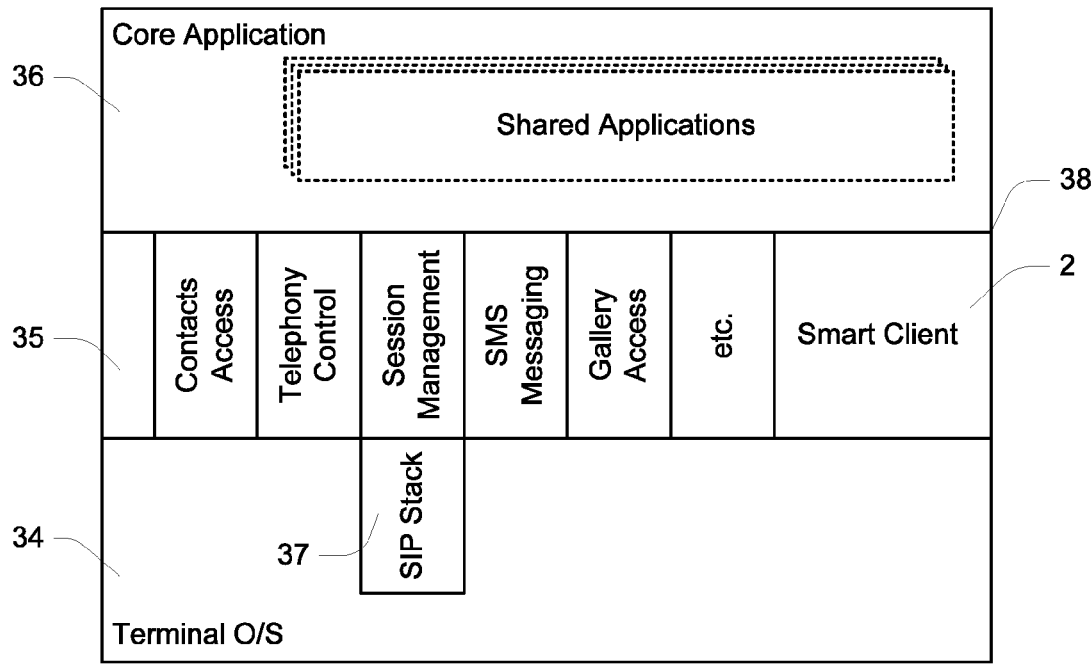
FIG. 5 schematically illustrates software components of a smart client used in an exemplary implementation of the system of FIG. 1.
FIG. 6 provides an abstract session class diagram for an implementation of the session management component of FIG. 5.

Referring to FIG. 5, a smart client application 2 runs within the terminal operating system 34. Examples of appropriate operating systems include Symbian Series60 and Microsoft Windows ME. The smart client comprises a set of components 35 for providing applications 36 with access to terminal capabilities. The present embodiment makes use of a Session Management component that utilises a SIP stack 37 within terminal operating system 34. This component is used by core application 4 and shared applications module 10, shown in FIG. 1, which are presented with an API 38 to each smart client component.

The Session Management component is responsible for maintaining the state of Session objects and synchronising this state across all terminals involved in that session. Each Session object maintains a SIP dialogue with the Session Management component of each participant invited called by this party. Synchronisation is achieved by each participant's Session Management component using these dialogues to send INVITE or UPDATE messages containing the new session state. When such an INVITE or UPDATE message is received by the Session Management component, it propagates the changes onwards in an INVITE or UPDATE message sent to the participants it invited into the session. If the local session has unsynchronised changes, these are included and also propagated back to the initiator of the INVITE or UPDATE.

Referring to FIG. 6, in an exemplary embodiment, dynamic applications executed by the smart client have access to Session objects. These session objects 60 are described in the UML abstract class definition. Unless otherwise stated, changes to a Session object are only communicated to other terminals in the session when the synchronise method is used. This allows multiple changes to be made and then communicated in a single transaction on each dialogue. Method behaviour can be as follows:

class Session.new
    Creates a new Session (allocated a unique identifier) that involves the local user, to which other participants can added using invite.
class Session.onNew
    Registers an object that will handle new Sessions created as a result of receiving an INVITE with an unrecognised session identifier.
Session.onUpdate
    Registers an object that will respond to changes to a specified aspect of this Session as a result of receiving any SIP message with the same session identifier that modifies that aspect of the Session state.
Session.synchronise
    Sends INVITE messages (on all SIP dialogues) containing the current local Session state.

Session.invite
   Adds a participant to this Session, which will send INVITE to establish a SIP dialogue with them when synchronise is next used.
Session.dismiss
   Closes the local SIP dialogue with the specified participant of this Session, which implies that they were originally invited by this user. If this leaves just one participant, the current user, then the Session becomes unusable and all references to it should be dropped.
Session.getOut
   Adds a specified shared application URL, including owner and key, to this Session.
Session.putAway
   Removes a specified shared application URL from this Session.
Session.focusOn
   Sends a MESSAGE on each SIP dialogue containing a SIP address or application URL to which the local user would like to draw the other participants' attention; this method does not need to be followed by synchronise.
Session.hold
   Marks the local user as temporarily absent from this Session.
Session.resume
   Marks the local user as present in this Session again.
Session.leave
   Ends all SIP dialogues with other participants and uses synchronise to send BYE messages; the Session object becomes unusable and all references to it should be dropped.
Session.include
   Adds the participants and applications from the specified Session into this one; the specified Session remains active and must be explicitly closed by an application using leave on either terminal if no longer required.

In the preferred embodiment the session state is encoded as multipart content within the SIP INVITE or UPDATE messages. One part contains the participants and resources involved in the session, while the others hold descriptions of any media streams (typically as SDP).

For example:

```
INVITE sip:bob@somewhere.com SIP/2.0
...
Content-Type: multipart/mixed; boundary=nextpart
--nextpart
Content-ID: <42aqr9.1@10.1.1.1>
Content-Type: application/xml
<?xml version="1.0" encoding="UTF-8"?>
<session>
    <participant url="sip:bob@somewhere.com">
        <source id=42aqr9.2@10.1.1.1 type="audio" />
    </participant>
    <resource url="http://server.com/resource/view"
              owner="sip:bob@somewhere.com"
key="a7Q8cfl4" />
</session>
--nextpart
Content-ID: <42aqr9.2@10.1.1.1>
Content-Type: application/sdp
...
```

Specific formal XML schema for the session state is not defined here; the example above is for illustrative purposes only. The session state is able to be encoded in substantially any form, provided the smart client has the requisite functionality to decode the required information. It will be appreciated that the required information includes:

The SIP address of each participant plus any media streams they are offering.
   The URL of each shared application, with the SIP address of the owner and a temporary key, plus any media streams it offers.

Figure 7:
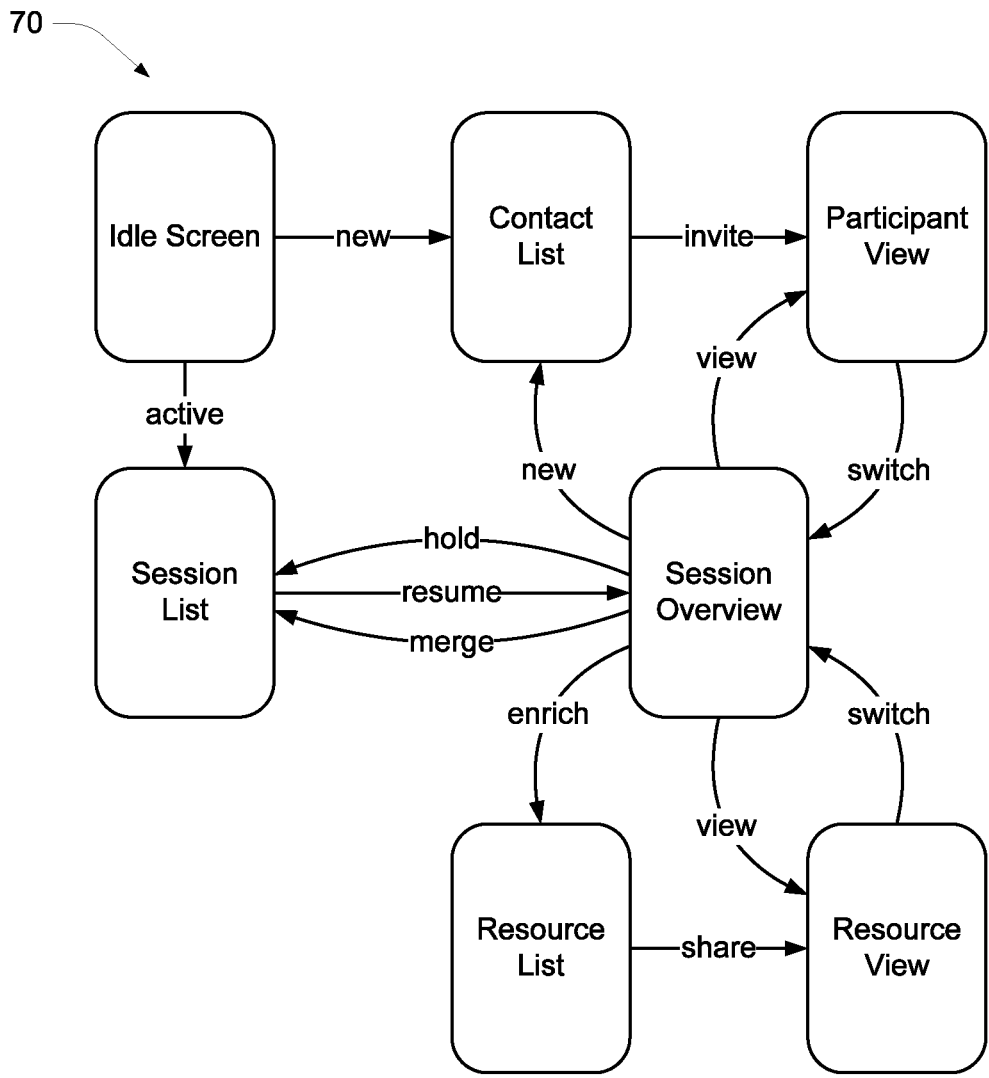
FIG. 7 provides some exemplary screen flows for an implementation of a user interface for the core application module of FIG. 1.

The core application 9 shown in FIG. 1, manages the overall layout and flow of control between different screens on the handheld device. Referring to FIG. 7, one exemplary embodiment provides a set of screens 70. The arrows between screens indicate the user action that results in the changing of screens. In these screens a shared application is represented to the user as a "resource". A goal of this and similar embodiments is to minimise the number of screens and the number of concepts a user has to understand.

Although the above embodiments generally assume a single SIP address for each terminal, IMS allows each network subscriber to have more than one SIP address. This allows each SIP address to be associated with a different set of shared applications. For example: a subscriber has business and personal SIP addresses, each associated with a respective set of applications suited to business and personal communication respectively. The core application framework is used to manage these different identities.

It will be appreciated that the illustrated system conducts multi-media communication sessions on communication terminals. Including the feature that a smart client able to dynamically download and execute applications on demand.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Interpretation

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

It will be appreciated that in network computing, a user's terminal typically loads applications on demand as part of a client-to-server, single person session. In accordance with an aspect of the present invention, an embodiment facilitates loading of applications on demand as part of a person-to-person communication session.

Although the present invention has been described with particular reference to certain preferred embodiments thereof, variations and modifications of the present invention can be effected within the spirit and scope of the following claims.

We claim:

1. A system including:
    a client application maintainable on a first communication terminal for dynamically loading on demand, data and executable code from a separate server in a network, the data and executable code representing an application held temporarily on the first communication terminal and executed by the client application;
    a core application maintained on core application servers in the network for execution by communication terminals and downloadable by the client application from a core application server for execution by the first communication terminal on demand, and when executed, the core application provides a user interface for selectively establishing and maintaining general purpose person to person communication sessions between the first communication terminal and a second communication terminal which has previously downloaded the core application, the core application allowing a general purpose person to person communication session between the first communication terminal and the second communication terminal;
    a multiplicity of shared applications maintained on shared application servers in the network for execution by communication terminals and downloadable by the client application from a shared application server for execution by the client application on demand, and when executed the shared applications provide a user interface for presenting and controlling a variety of multi-media content from the second communication terminal; and
    an application management protocol by which the client application communicates with the core application servers and shared application servers on the network to populate and maintain its data and executable code for the core applications and shared applications respectively.

2. A system according to claim 1 wherein the first communication terminal is a handheld device.

3. A system according to claim 2 wherein the first handheld device is a cellular telephone.

4. A system according to claim 1 wherein a user of the first and second communication terminal is allocated one or more unique user identifiers.

5. A system according to claim 4 wherein the core application associates with each user identifier a set of subscriptions to shared applications.

6. A system according to claim 5 wherein the core application allows the terminal user to access any shared application to which they have subscribed.

7. A system according to claim 4 wherein the shared applications associate with each user identifier a collection of data exclusively allocated to that user.

8. A system according to claim 4 wherein the unique identifier is a SIP address.

9. A system according to claim 4 wherein the unique identifier is an Instant Messaging service username.

10. A system according to claim 1 wherein the application management protocol is carried within the Transmission Control Protocol (TCP).

11. A system according to claim 1 wherein the application management protocol is carried within the Hyper-Text Transfer Protocol (HTTP).

12. A system according to claim 1 further comprising a mechanism for establishing and maintaining person-to-person communication sessions with shared applications, including:
    a user interface to the core application allowing a first user to initiate a session with a second user;
    a user interface to the core application allowing a first user to select a shared application to include in the session such that it is accessible to the second user;
    a user interface to the shared application allowing the first user full access to their data, and a user interface to the shared application allowing the second user more restricted access to the first user's data;
    a user interface to the core application allowing a user to merge two sessions to create a combined session with multiple participants and shared applications; and
    a session management protocol by which the core application maintains consistent session state between the participating terminals.

13. A system according to claim 12 wherein the session management protocol is the Session Initiation Protocol (SIP).

14. A system according to claim 12 wherein the session management protocol is based on an Instant Messaging protocol such as XMPP or IMPS and extensions thereof.

15. A system according to claim 7 wherein each shared application included in a session provides a temporary secure key by which session participants may gain access to the shared application.

16. A system according to claim 7 wherein the core application allows two sessions to be combined into a single session such that the participants and shared applications in the new session include those from both original sessions.

17. A system according to claim 7 wherein the core application allows a user to maintain multiple concurrent sessions and to switch between them.

* * * * *